(12) United States Patent
Yang et al.

(10) Patent No.: US 10,240,585 B2
(45) Date of Patent: Mar. 26, 2019

(54) EQUIVALENT VARIABLE PITCH DIFFERENTIAL CONTROL METHOD AND APPARATUS

(71) Applicant: CSIC HAIZHUANG WINDPOWER CO., LTD., Chongqing (CN)

(72) Inventors: Wei Yang, Chongqing (CN); Youchuan Tao, Chongqing (CN); Fen Tao, Chongqing (CN); Jie Liu, Chongqing (CN)

(73) Assignee: CSIC HAIZHUANG WINDPOWER CO., LTD., Chongqing (CN)

( * ) Notice: Subject to any disclaimer, the term of this patent is extended or adjusted under 35 U.S.C. 154(b) by 0 days.

(21) Appl. No.: 15/542,414

(22) PCT Filed: Feb. 25, 2016

(86) PCT No.: PCT/CN2016/074563
§ 371 (c)(1),
(2) Date: Jul. 7, 2017

(87) PCT Pub. No.: WO2017/000569
PCT Pub. Date: Jan. 5, 2017

(65) Prior Publication Data
US 2018/0003155 A1    Jan. 4, 2018

(30) Foreign Application Priority Data

Jun. 30, 2015    (CN) .......................... 2015 1 0375082

(51) Int. Cl.
*F03D 7/04*    (2006.01)
*F03D 7/02*    (2006.01)
(Continued)

(52) U.S. Cl.
CPC ............... *F03D 7/044* (2013.01); *F03D 7/02* (2013.01); *F03D 7/0224* (2013.01); *F03D 17/00* (2016.05);
(Continued)

(58) Field of Classification Search
USPC ................................ 290/22; 700/290, 37, 42
See application file for complete search history.

(56) References Cited

U.S. PATENT DOCUMENTS

| 9,476,407 | B2  |   | 10/2016 | Pineda Amo |             |
|-----------|-----|---|---------|------------|-------------|
| 2010/0066086 | A1 | * | 3/2010 | Ko         | F03D 7/0224 |
|           |     |   |         |            | 290/44      |

(Continued)

FOREIGN PATENT DOCUMENTS

| CN | 102865192 A | 1/2013 |
|----|-------------|--------|
| CN | 103362738 A | 10/2013 |

(Continued)

OTHER PUBLICATIONS

First Office Action dated May 2, 2018 for Chinese Appl.No. 201510375082.2, 6 pages.

(Continued)

*Primary Examiner* — Emilio J Saavedra
(74) *Attorney, Agent, or Firm* — U.S. Fairsky LLP; Yue(Robert) Xu

(57) ABSTRACT

An equivalent variable pitch differential control method and apparatus. The method includes: acquire a first control parameter and a second control parameter respectively by means of a static energy deviation PI control method; acquire an equivalent differential third control parameter using a dynamic energy deviation; and by taking a wind wheel measurement rotating speed and a wind wheel reference rotating speed as inputs, a proportion integration differentiation controller controls a wind generating set accord- (Continued)

ing to the first control parameter, the second control parameter, and the third control parameter, thereby making a wind wheel rotating speed follow the wind wheel reference rotating speed. A wind generating set is controlled in real time by combining first and second control parameters and an equivalent differential third control parameter to serve as parameter values of the proportion integration differentiation controller.

10 Claims, 7 Drawing Sheets

(51) Int. Cl.
  *F03D 17/00* (2016.01)
  *G05B 11/42* (2006.01)
(52) U.S. Cl.
  CPC .......... *G05B 11/42* (2013.01); *F05B 2240/21* (2013.01); *F05B 2270/328* (2013.01); *F05B 2270/706* (2013.01); *Y02E 10/723* (2013.01)

(56) References Cited

U.S. PATENT DOCUMENTS

| 2011/0316277 | A1* | 12/2011 | Skaare | F03D 7/0224 |
| | | | | 290/44 |
| 2014/0306451 | A1 | 10/2014 | Abdur-Rahim et al. | |

FOREIGN PATENT DOCUMENTS

| CN | 103925156 A | 7/2014 |
| CN | 104612898 A | 5/2015 |
| DE | 3415428 C2 | 2/1992 |
| EP | 2447527 A1 | 5/2012 |
| EP | 2778395 A2 | 9/2014 |
| EP | 2784303 A1 | 10/2014 |
| KR | 20140072364 | 6/2014 |

OTHER PUBLICATIONS

International Search Report for PCT/CN2016/074563, dated May 31, 2016, ISA/CN.
Search Report dated Jul. 9, 2018 for European patent application No. 16816934.0, 5 pages.

* cited by examiner

EQUIVALENT VARIABLE PITCH DIFFERENTIAL CONTROL METHOD AND APPARATUS

This application is a national phase of International Application No. PCT/CN2016/074563, titled "EQUIVALENT VARIABLE PITCH DIFFERENTIAL CONTROL METHOD AND APPARATUS", filed on Feb. 25, 2016, which claims the priority of Chinese Patent Application No. 201510375082.2, titled "METHOD AND APPARATUS FOR EQUIVALENT DIFFERENTIAL CONTROL OF VARIABLE PITCH" and filed with the State Intellectual Property Office on Jun. 30, 2015, both of which are incorporated herein by reference in entireties.

FIELD OF THE INVENTION

The present disclosure relates to the field of a wind generating set control technology, and in particular to a method for equivalent differential control of variable pitch and apparatus.

BACKGROUND OF THE INVENTION

In the conventional variable pitch control technology, a generator rotating speed is taken as an input in most cases, a PI controller (proportional integral controller) controls and outputs a variable pitch angle, and then the rotating speed is controlled by a variable pitch executive device.

The traditional PI controller has a simple control structure, and usually acquires a control parameter by means of modeling and adjusting by stimulation software like MATLAB. Since the accuracy of a wind generating set model has a significant influence on the setting result of the control parameter and it is quite difficult to build an accurate model for the kind of large-scale structure with a high degree of nonlinearity like a large wind generating set, the control parameter acquired by means of modeling and adjusting by the stimulation software like MATLAB often differs significantly from an actual wind generating set operational parameter. And generally the PI control method is short of control on dynamic deviation, thus the operating stability of the wind generating set is decreased under the wind condition of quick change of a wind speed.

Overall, the problem of how to acquire an accurate control parameter and how to improve the dynamic variable pitch system action response capability are urgent to resolve at present to the person skilled in the art.

SUMMARY OF THE INVENTION

In view of the above, an object of the present disclosure is to provide a method for equivalent differential control of variable pitch and apparatus to acquire accurate control parameters and to improve the dynamic variable pitch system action response capability.

In order to attain the foregoing objective, the present disclosure provides the following technical solutions.

In an aspect, there is provided a method for equivalent differential control of variable pitch in the present disclosure. The method includes:

acquiring a first control parameter and a second control parameter respectively by means of a static energy deviation PI control method;

acquiring an equivalent differential third control parameter by using a dynamic energy deviation; and controlling, by a proportion integration differentiation (PID) controller, a wind generating set according to the first control parameter, the second control parameter, and the third control parameter by taking a wind wheel measurement rotating speed and a wind wheel reference rotating speed as inputs, so that the wind wheel measurement rotating speed follows the wind wheel reference rotating speed, where the first control parameter is acquired according to the following formula:

$$K_P = \frac{2I_{drivetrain}\Omega_{ref}\zeta\omega}{G_{gearbox}\left(-\frac{\partial P}{\partial \theta}\right)}$$

where $G_{gearbox}$ is the gearbox transmission ratio, $\omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle;

the second control parameter is acquired according to the following formula:

$$K_I = \frac{I_{drivetrain}\Omega_{ref}\omega^2}{G_{gearbox}\left(-\frac{\partial P}{\partial \theta}\right)}$$

where $G_{gearbox}$ is the gearbox transmission ratio, $\Omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle; and the third control parameter is acquired according to the following formula:

$$K_d = \left|\frac{I_{drivetrain}(\Omega - \Omega_{ref})}{G_{gearbox}\left(\frac{\partial p}{\partial \beta}\right)}\right|$$

where $G_{gearbox}$ is the gearbox transmission ratio, $\Omega$ is the wind wheel measurement rotating speed, $\Omega_{ref}$ is the wind wheel reference rotating speed, $\omega$ is the frequency, and $\zeta$ is the damping.

Preferably, the above process of acquiring a first control parameter and a second control parameter respectively includes:

acquiring a first relation among a wind wheel pneumatic torque, mechanical power and a wind wheel reference rotating speed and a second relation among the wind wheel pneumatic torque, a variable pitch angle, the mechanical power and the wind wheel reference rotating speed respectively within a variable pitch range; and performing Taylor expansion on the first relation and on the second relation respectively, and acquiring the variable pitch angle according to the following formula:

$$\Delta\theta = K_P G_{gearbox}\Delta\Omega + K_I \int_0^t G_{gearbox}\Delta\Omega dt$$

where $\Delta\theta$ is the variable pitch angle variation near a set point, $K_P$ is the first control parameter, $K_I$ is the second control parameter, $\Delta\Omega$ is the wind wheel rotating speed variation, $G_{gearbox}$ is the gearbox transmission ratio, and t is the time variable.

On the basis of the above variable pitch angle formula, by means of an aerodynamics torque relation and a control theory, a second-order differential relation of the wind wheel reference rotating speed is acquired according to the following formula:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} + \left[\frac{1}{\Omega_{ref}}\left(-\frac{\partial P}{\partial \theta}\right)G_{gearbox}K_I\right]\phi = 0$$

where $I_{drivetrain}$ is the moment of inertia in drive train of a wind generating set, P is the absorbed power by a wind wheel, $\theta$ is the variable pitch angle, $\ddot{\phi}$ is the wind wheel rotational acceleration, $\dot{\phi}$ is the wind wheel rotating speed variation and $\phi$ is the wind wheel rotating speed.

A stable state of the second-order differential relation of a wind wheel rotating speed is acquired, and a first control parameter and a second control parameter are acquired in the stable state.

Preferably, the process of performing Taylor expansion on the second relation includes:

acquiring a relationship between $\partial P/\partial \theta$ of a blade of a variable-pitch wind generating set and a variable pitch angle $\theta$ by means of blade design, and performing Taylor expansion on the second relation according to the acquired relationship.

Preferably, the process of acquiring the third control parameter includes:

acquiring a wind wheel rotating total energy deviation and a static energy deviation by means of an aerodynamics torque relationship;

acquiring a variable pitch angle of variable pitch absorbed energy according to the total energy deviation and the static energy deviation; and acquiring the third control parameter according to the acquired variable pitch angle.

Preferably, the above process of acquiring a viable pitch angle of variable pitch absorbed energy according to the total deviation and the static energy deviation includes:

eliminating the static energy deviation, acquiring a residual dynamic energy deviation, and acquiring the variable pitch angle of variable pitch absorbed energy according to the residual dynamic energy deviation.

In another aspect, there is provided an apparatus for equivalent differential control of variable pitch in the present disclosure. The apparatus includes:

a first acquisition unit configured to acquire a first control parameter and a second control parameter respectively by means of a static energy deviation PI control method;

a second acquisition unit configured to acquire an equivalent differential third control parameter by using a dynamic energy deviation; and a controlling unit configured to control, by a proportion integration differentiation (PID) controller, a wind generating set according to the first control parameter, the second control parameter and the third control parameter by taking a wind wheel measurement rotating speed and a wind wheel reference rotating speed as inputs, so that the wind wheel measurement rotating speed follows the wind wheel reference rotating speed;

where the first control parameter is acquired according to the following formula:

$$K_P = \frac{2I_{drivetrain}\Omega_{ref}\zeta\omega}{G_{gearbox}\left(-\frac{\partial P}{\partial \theta}\right)}$$

where $G_{gearbox}$ is the gearbox transmission ratio, $\Omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle;

the second control parameter is acquired according to the following formula:

$$K_I = \frac{I_{drivetrain}\Omega_{ref}\omega^2}{G_{gearbox}\left(-\frac{\partial P}{\partial \theta}\right)}$$

where $G_{gearbox}$ is the gearbox transmission ratio, $\Omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle; and the third control parameter is acquired according to the following formula:

$$K_d = \left|\frac{I_{drivetrain}(\Omega - \Omega_{ref})}{G_{gearbox}\left(\frac{\partial p}{\partial \beta}\right)}\right|$$

where $G_{gearbox}$ is the gearbox transmission ratio, $\Omega$ is the wind wheel measurement rotating speed, $\Omega_{ref}$ is the wind wheel reference rotating speed, $\omega$ is the frequency, and $\zeta$ is the damping.

Preferably, the first acquisition unit includes:

a third acquisition unit configured to acquire a first relation among a wind wheel pneumatic torque, mechanical power and a wind wheel reference rotating speed and a second relation among the wind wheel pneumatic torque, a variable pitch angle, the mechanical power and the wind wheel reference rotating speed respectively within a variable pitch angle;

a first calculation unit configured to perform Taylor expansion on the first relation and on the second relation respectively and then acquire the variable pitch angle according to the following formula:

$$\Delta\theta = K_P G_{gearbox} \Delta\Omega + K_I \int_0^t G_{gearbox}\Delta\Omega dt$$

where $\Delta\theta$ is the variable pitch angle variation near a set point, $K_P$ is the first control parameter, $K_I$ is the second control parameter, $\Delta\Omega$ is the wind wheel rotating speed variation, $G_{gearbox}$ is the gearbox transmission ratio, and t is the time variable;

a second calculation unit configured to acquire a second-order differential relation of the wind wheel reference rotating speed according to the following formula by means of an aerodynamics torque relation and a control theory on the basis of the above variable pitch angle formula:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} +$$
$$\left[\frac{1}{\Omega_{ref}}\left(-\frac{\partial P}{\partial \theta}\right)G_{gearbox}K_I\right]\phi = 0$$

where $I_{drivetrain}$ is the moment of inertia in drive train of a wind generating set, P is the absorbed power by a wind wheel, θ is the variable pitch angle, $\ddot{\phi}$ is the wind wheel rotational acceleration, $\dot{\phi}$ is the wind wheel rotating speed variation and φ is the wind wheel rotating speed; and a fourth acquisition unit configured to acquire a stable state of the second-order differential relation of the wind wheel reference rotating speed and acquire the first control parameter and the second control parameter in the stable state.

Preferably, the first calculation unit includes:

a fifth acquisition unit configured to acquire a relationship between ∂P/∂θ of a blade of a variable-pitch generating set and the variable pitch angle θ by means of blade design and perform Taylor expansion on the second relation according to the required relationship.

Preferably, the second acquisition unit includes:

a sixth acquisition unit configured to acquire a wind wheel rotating total energy deviation and a static energy deviation by means of an aerodynamics torque relationship;

a seventh acquisition unit configured to variable pitch angle of variable pitch absorbed energy according to the total energy deviation and the static energy deviation; and an eighth acquisition unit configured to acquire a third control parameter according to the acquired variable pitch angle.

Preferably, the seventh acquisition unit includes:

a ninth acquisition unit configured to eliminate the static energy deviation, acquire a residual dynamic energy deviation, and acquire a variable pitch angle of variable pitch absorbed energy according to the residual dynamic energy deviation.

Compared with the prior art, the present invention has the following advantages.

With the method for equivalent differential control of variable pitch and apparatus provided in the present disclosure, a wind generating set is controlled in a real-time manner by combing first and second control parameters acquired by means of a static energy deviation PI control method and an equivalent differential third control parameter acquired by means of a dynamic energy deviation to serve as parameter values of a PID controller. Compared with the prior art, the method for equivalent differential control of variable pitch provided in the present disclosure may acquire a control parameter with a higher degree of precision in a PID controller, and can improve the dynamic variable pitch action response capability of a large wind generating set under the wind condition of quick change of a wind speed when the wind generating set is controlled by using an equivalent differential parameter acquired by dynamic energy deviation; thus situations such like an over speed of a generating set, an excessive small gap between blade tips, an generated extreme load and the like can be avoided.

BRIEF DESCRIPTION OF THE DRAWINGS

The accompany drawings used in the description of the embodiments will be described briefly as follows, so that the technical solutions according to the embodiments of the present disclosure will become more apparent. It is clear that the accompany drawings in the following description are only some embodiments of the present disclosure. For those skilled in the art, other accompany drawings may be obtained according to these accompany drawings without any creative work.

DETAILED DESCRIPTION OF THE EMBODIMENTS

The technical solutions according to the embodiments of the present disclosure will be described clearly and completely as follows in conjunction with the accompany drawings in the embodiments of the present disclosure. It is clear that the described embodiments are only a part of the embodiments according to the present disclosure. All the other embodiments obtained by those skilled in the art based on the embodiments in the present disclosure without any creative work falls within the scope of the present disclosure.

Figure 1:
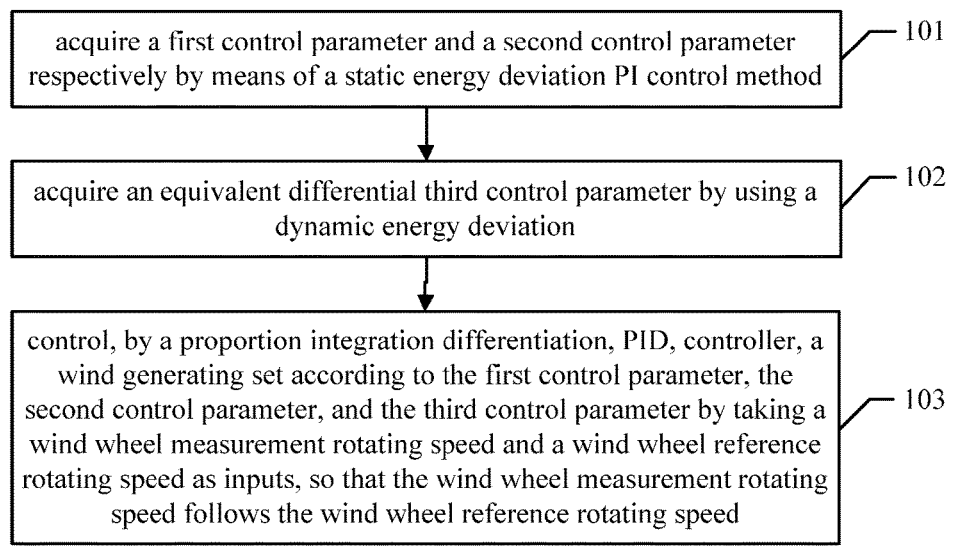
FIG. 1 is a flow diagram illustrating a method for equivalent differential control of variable pitch according to an embodiment of the present disclosure.

As shown in FIG. 1, a method for equivalent differential control of variable pitch according to an embodiment of the present disclosure includes steps 101 to 103.

In step 101, a first control parameter and a second control parameter are acquired respectively by means of a static energy deviation PI control method.

In step 102, an equivalent differential third control parameter is acquired by using a dynamic energy deviation.

In step 103, a proportion integration differentiation (PID) controller controls a wind generating set according to the first control parameter, the second control parameter and the third control parameter by taking a wind wheel measurement rotating speed and a wind wheel reference rotating speed as inputs, so that the wind wheel measurement rotating speed follows the wind wheel reference rotating speed.

The first control parameter is acquired according to the following formula:

$$K_P = \frac{2I_{drivetrain}\Omega_{ref}\zeta\omega}{G_{gearbox}\left(-\frac{\partial P}{\partial \theta}\right)}$$

where $G_{gearbox}$ is the gearbox transmission ratio, $\Omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle.

The second control parameter is acquired according to the following formula:

$$K_I = \frac{I_{drivetrain}\Omega_{ref}\omega^2}{G_{gearbox}\left(-\frac{\partial P}{\partial \theta}\right)}$$

where $G_{gearbox}$ is the gearbox transmission ratio, $\Omega_{ref}$ is the wind wheel reference rotating speed, $\omega$ is the frequency, $\zeta$ is the damping, $I_{drivetrain}$ is the moment of inertia in drive train of a wind generating set, P is the absorbed power by a wind wheel, and $\theta$ is the variable pitch angle.

the third control parameter according to the following formula:

$$K_d = \left|\frac{I_{drivetrain}(\Omega - \Omega_{ref})}{G_{gearbox}\left(\frac{\partial P}{\partial \beta}\right)}\right|$$

where $G_{gearbox}$ is the gearbox transmission ratio, $\Omega$ is the wind wheel measurement rotating speed, $\Omega_{ref}$ is the wind wheel reference rotating speed, $\omega$ is the frequency, and $\zeta$ is the damping.

It is important to note that, in embodiments of the present disclosure, by combining PI control, derivation procedure of dynamic energy deviation and PID (Proportion Integration Differentiation) control, a first control parameter, a second control parameter and a third control parameter are acquired respectively; and then by using the acquired three control parameters to control the PID controller, the wind wheel rotating speed of a wind generating set is kept to be equal to the wind wheel reference rotating speed constantly, i.e., by means of adjusting the three control parameters according to actual rotating speed deviation $\Omega - \Omega_{ref}$ in a real-time manner. The rotating speed control capability of a wind generating set under turbulence wind conditions is improved.

According to a method for equivalent differential control of variable pitch provided in the present disclosure, a wind generating set is controlled in a real-time manner by combing first and second control parameters acquired by means of a static energy deviation PI control method and an equivalent differential third control parameter acquired by means of a dynamic energy deviation to serve as parameter values of a PID controller. Compared with the prior art, the method for equivalent differential control of variable pitch provided in the present disclosure may acquire a control parameter with a higher degree of precision in a PID controller, and can improve the dynamic variable pitch action response capability of a large wind generating set under the wind condition of quick change of a wind speed when the wind generating set is controlled by using an equivalent differential parameter acquired by dynamic energy deviation; thus situations such like an over speed of a generating set, an excessive small gap between blade tips, generating an extreme load and the like can be avoided.

Figure 2:
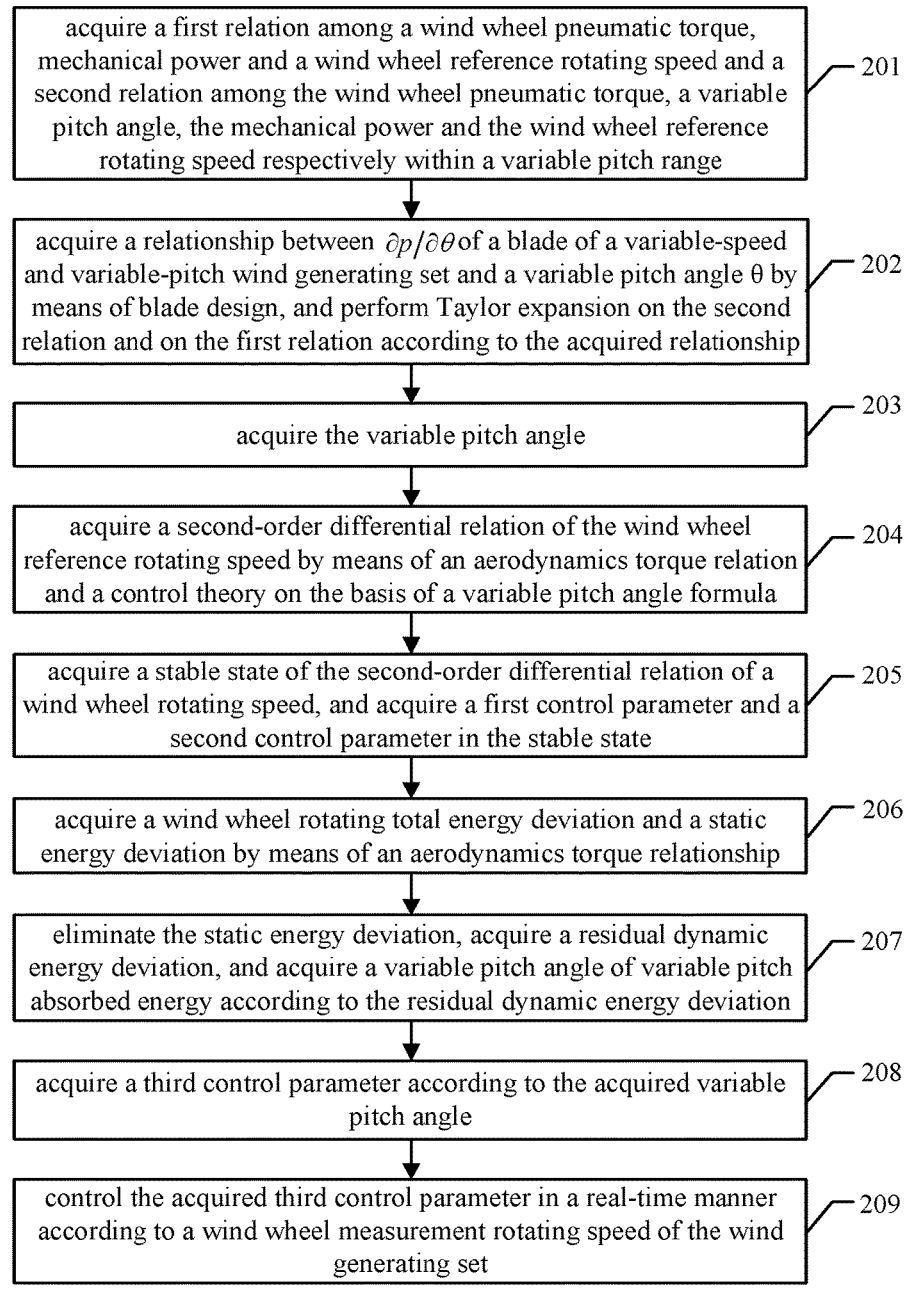
FIG. 2 is a flow diagram illustrating a method for equivalent differential control of variable pitch according to another embodiment of the present disclosure.

Referring to FIG. 2, FIG. 2 illustrates a flow diagram of a method for equivalent differential control of variable pitch according to another embodiment of the present disclosure. The method includes steps 201 to 209.

In step 201, a first relation among a wind wheel pneumatic torque, mechanical power and a wind wheel reference rotating speed and a second relation among the wind wheel pneumatic torque, a variable pitch angle, the mechanical power and the wind wheel reference rotating speed are acquired respectively within a variable pitch angle.

In step 202, a relationship between $\partial P/\partial \theta$ of a blade of a variable-pitch wind generating set and a variable pitch angle $\theta$ is acquired by means of blade design, and Taylor expansion is performed on the second relation and on the first relation according to the acquired relationship.

In step 203, the variable pitch angle is acquired according to the following formula:

$$\Delta\theta = K_P G_{gearbox}\Delta\Omega + K_I \int_0^T G_{gearbox} \Delta\Omega dt$$

where $\Delta\theta$ is the variable pitch angle variation near a set point, $K_P$ is the first control parameter, $K_I$ is the second control parameter, $\Delta\Omega$ is the wind wheel rotating speed variation, $G_{gearbox}$ is the gearbox transmission ratio, and t is the time variable.

In step 204, on the basis of the variable pitch angle formula above, a second-order differential relation of the wind wheel reference rotating speed is acquired according to the following formula, by means of an aerodynamics torque relation and a control theory:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} + \left[\frac{1}{\Omega_{ref}}\left(-\frac{\partial P}{\partial \theta}\right)G_{gearbox}K_I\right]\phi = 0$$

where $I_{drivetrain}$ is the moment of inertia in drive train of a wind generating set, P is the absorbed power by a wind wheel, $\theta$ is the variable pitch angle, $\ddot{\phi}$ is the wind wheel rotational acceleration, $\dot{\phi}$ is the wind wheel rotating speed variation and $\phi$ is the wind wheel rotating speed.

In step 205, a stable state of the second-order differential relation of a wind wheel rotating speed is acquired, and a first control parameter and a second control parameter are acquired in the stable state.

In step 206, a wind wheel rotating total energy deviation and a static energy deviation are acquired by means of an aerodynamics torque relationship.

In step 207, the static energy deviation is eliminated, a residual dynamic energy deviation is acquired, and a variable pitch angle of variable pitch absorbed energy is acquired according to the residual dynamic energy deviation.

In step 208, a third control parameter is acquired according to the acquired variable pitch angle.

In step 209, the acquired third control parameter is controlled in a real-time manner according to a wind wheel measurement rotating speed of the wind generating set.

When in the environment of a high wind speed, a variable-pitch wind generator restricts the absorbed wind energy by adjusting the variable pitch angle of a wind wheel blade, thereby keeping the wind generator working in an area set by the rated power. By reason of the influence of the aerodynamic performance of the wind wheel blade, the adjusting of the variable pitch angle of a blade has a non-linear relationship with wind velocity variation. So parameters of a variable pitch controller should be adjusted according to the aerodynamic characteristics of the wind wheel blade to acquire a better variable pitch controlling effect. To reduce the impact on control parameter values caused by an inaccurate modeling by software like MATLAB, a method for equivalent differential control of variable pitch is provided in embodiments of the present disclosure, that is, to adjust PI control parameter by means of dynamic relationships directly.

Firstly, the relation among a wind wheel pneumatic torque, mechanical power and a wind wheel reference rotating speed is acquired according to the formula:

$$T_{gen} = \frac{P_0}{G_{gearbox}\Omega_{ref}} \quad (1)$$

where $T_{gen}$ is the generator torque, $G_{gearbox}$ is the drive ratio of a gearbox, and $\Omega_{ref}$ is the wind wheel reference rotating speed.

Similarly, the relation among a wind wheel pneumatic torque, a variable pitch angle, mechanical power and a wind wheel reference rotating speed is acquired according to the formula:

$$T_{aero}(\theta) = \frac{P(\theta, \Omega_{ref})}{\Omega_{ref}} \quad (2)$$

Performing first-order Taylor expansion on the above formula (1) and (2), the following formula are acquired:

$$T_{gen} \approx \frac{P_0}{G_{gearbox}\Omega_{ref}} - \frac{P_0}{G_{gearbox}\Omega_{ref}^2}\Delta\Omega \quad (3)$$

$$T_{aero} = \frac{P_0}{\Omega_{ref}} + \frac{1}{\Omega_{ref}}\left(\frac{\partial P}{\partial \theta}\right)\Delta\theta \quad (4)$$

where $\Delta\theta$ is the variable pitch angle variation near a set point;

The expression of the adjusting of a variable pitch angle is acquired by using a PI controller as follow:

$$\Delta\theta = K_P G_{gearbox}\Delta\Omega + K_I \int_0^t G_{gearbox}\Delta\Omega dt \quad (5)$$

And the aerodynamics torque relation is as follows:

$$T_{aero} - G_{gearbox}T_{gen} = \quad (6)$$
$$(I_{rotor} + G_{gearbox}^2 I_{gen})\frac{d}{dt}(\Omega_{ref} + \Delta\Omega) = I_{drivetrain}\Delta\dot{\Omega}$$

where $T_{aero}$ is the aerodynamic torque of a low-speed axle, $I_{rotor}$ and $I_{gen}$ are the inertia moment of a wind wheel and of a generator respectively, $\Delta\Omega$ is the wind wheel rotating speed variation, and $\Delta\dot{\Omega}$ is the wind wheel rotational acceleration.

According to classic PI control theory, the classic second-order differential relation of a wind wheel rotating speed is as follows:

$$I\ddot{\phi} + D\dot{\phi} + K\phi = 0 \quad (7)$$

Letting $\Delta\Omega = \dot{\phi}$, and by combing formula (3)-(6), the formula (7) can be transformed as follows:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} + \quad (8)$$
$$\left[\frac{1}{\Omega_{ref}}\left(-\frac{\partial P}{\partial \theta}\right)G_{gearbox}K_I\right]\phi = 0$$

In the above second-order differential relation formula, the frequency $\omega$ and damping $\zeta$ are as follows respectively:

$$\omega = \sqrt{\frac{K}{I}}, \zeta = \frac{D}{2\sqrt{KI}} = \frac{D}{2I\omega} \quad (9)$$

According to the classic control theory, when the frequency of an apparatus is $\omega=0.6$ and the damping is $\zeta=0.6\sim0.7$, the second-order apparatus can achieve a satisfactory stable state. Thus the relations among variable pitch PI parameters and $\partial P/\partial\theta$ are as following:

$$K_P = \frac{2I_{drivetrain}\Omega_{ref}\zeta\omega}{G_{gearbox}\left(-\frac{\partial P}{\partial \theta}\right)} \quad (10)$$

$$K_I = \frac{I_{drivetrain}\Omega_{ref}\omega^2}{G_{gearbox}\left(-\frac{\partial P}{\partial \theta}\right)} \quad (11)$$

Figure 3:
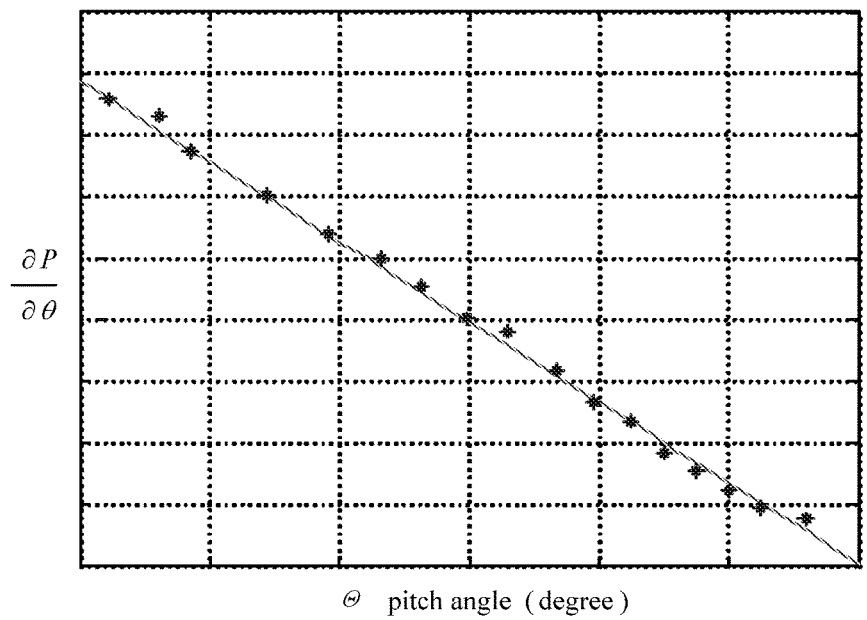
FIG. 3 is a schematic diagram illustrating a relationship between ∂P/∂θ of a blade of a variable-pitch generating set and a variable pitch angle θ in a method for equivalent differential control of variable pitch according to an embodiment of the present disclosure.

As shown in FIG. 3, the relationship between $\partial P/\partial\theta$ of a blade of a variable-pitch wind generating set and a variable pitch angle $\theta$ is approximately considered as first-order linear and is easy to obtain by means of blade design. It is important to note that, almost the relationship between $\partial P/\partial\theta$ of a blade of each variable-pitch wind generating set and a variable pitch angle $\theta$ is approximately considered as a first-order linear relationship.

A wind wheel rotating total energy deviation and a static energy deviation are acquired by means of the aerodynamics torque relation formula (6) in the following formula:

$$T_{aero}\Omega - G_{gearbox}T_{gen}\Omega = I_{drivetrain}\Delta\dot{\Omega}\Omega \quad (12)$$

that is, the total energy deviation is:

$$\Delta P_a = I_{drivetrain}\Delta\dot{\Omega}\Omega \quad (13)$$

$$T_{aero}\Omega_{ref} - G_{gearbox}T_{gen}\Omega_{ref} = I_{drivetrain}\Delta\dot{\Omega}\Omega \quad (14)$$

that is, the static energy deviation is:

$$\Delta P_s = I_{drivetrain}\Delta\dot{\Omega}\Omega_{ref} \quad (15)$$

Since the static energy deviation is eliminated by PI control, the residual dynamic energy deviation is:

$$\Delta P_a - \Delta P_s = I_{drivetrain}\Delta\dot{\Omega}(\Omega - \Omega_{ref}) \quad (16)$$

The following formula can be acquired by associating formula (16) with the variable pitch angle:

$$\frac{\Delta P_a - \Delta P_s}{\Delta \beta}\Delta\beta = I_{drivetrain}\Delta\dot{\Omega}(\Omega - \Omega_{ref}) \quad (17)$$

By combining the relationship between variable pitch angle and ∂P/∂θ as shown in FIG. 3, the variable pitch angle of variable pitch absorbed energy acquired by the dynamic energy deviation is:

$$\Delta\beta = \left|\frac{I_{drivetrain}(\Omega - \Omega_{ref})}{\frac{\partial p}{\partial \beta}}\right|\Delta\dot{\Omega} \quad (18)$$

Combining PID control theory, the dynamic deviation adjusting is considered as the differential part of the PID controller (D part), that is:

$$\Delta\beta = K_d\Delta\dot{\Omega} = \left|\frac{I_{drivetrain}(\Omega - \Omega_{ref})}{G_{gearbox}\left(\frac{\partial p}{\partial \beta}\right)}\right|\Delta\dot{\Omega} \quad (19)$$

$$K_d = \left|\frac{I_{drivetrain}(\Omega - \Omega_{ref})}{G_{gearbox}\left(\frac{\partial p}{\partial \beta}\right)}\right| \quad (20)$$

The control parameter $K_d$, acquired according to formula (20), is controlled in a real-time manner according to the actual rotating speed deviation $\Omega - \Omega_{ref}$, and is a supplement as PI control. Thus the effect of a wind generating set on controlling the wind wheel measurement rotating speed under turbulent wind conditions is improved effectively.

The PID control calculation is indicated as follows:

$$\Delta\theta = K_P G_{gearbox}\Delta\Omega + K_I \int_0^t G_{gearbox}\Delta\Omega dt + K_D G_{gearbox}\Delta\dot{\Omega} \quad (21)$$

According to the method for equivalent differential control of variable pitch provided in the present disclosure, by combining first and second control parameters acquired by means of a static energy deviation PI control method and an equivalent differential third control parameter acquired by means of a dynamic energy deviation to serve as parameter values of a PID controller, thereby controls a wind generating set in a real-time manner. Compared with the prior art, the first control parameter, the second control parameter and the third control parameter acquired in the method for equivalent differential control of variable pitch provide in the present disclosure are more accurate comparatively, and the three control parameters can be used in PID control directly instead of being debugged one by one in the modeling process according to the prior art. So the debugging time for acquiring accurate parameters is reduced, and the unnecessary application risk is avoided.

Figure 4:
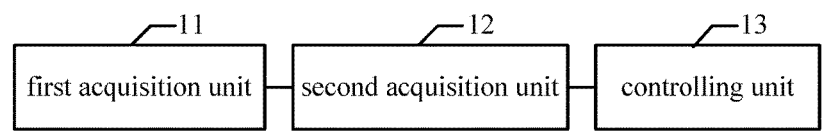
FIG. 4 is a structure schematic diagram illustrating an apparatus for equivalent differential control of variable pitch according to an embodiment of the present disclosure.

Corresponding to embodiments of the above method, an apparatus for equivalent differential control of variable pitch is also provided in embodiments of the present disclosure. Referring to FIG. 4, a structure schematic diagram of an apparatus for equivalent differential control of variable pitch according to an embodiment of the present disclosure is illustrated, including: a first acquisition unit 11, a second acquisition unit 12 and a controlling unit 13.

The first acquisition unit 11 is configured to acquire a first control parameter and a second control parameter respectively by means of a static energy deviation PI control method.

Figure 5:
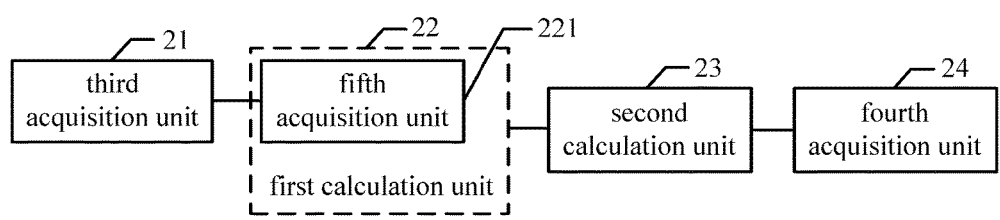
FIG. 5 is a substructure schematic diagram illustrating an apparatus for equivalent differential control of variable pitch according to an embodiment of the present disclosure.

Referring to FIG. 5, a substructure schematic diagram of an apparatus for equivalent differential control of variable pitch according to an embodiment of the present disclosure is illustrated, which includes a third acquisition unit 21, a first calculation unit 22, a second calculation unit 23 and a fourth acquisition unit 24.

The third acquisition unit 21 is configured to acquire a first relation among a wind wheel pneumatic torque, mechanical power and a wind wheel reference rotating speed and a second relation among the wind wheel pneumatic torque, a variable pitch angle, the mechanical power and the wind wheel reference rotating speed respectively within a variable pitch range.

The first calculation unit 22 is configured to perform Taylor expansion on the first relation and the second relation respectively, and to acquire the variable pitch angle according to the following formula:

$$\Delta\theta = K_P G_{gearbox}\Delta\Omega + K_I \int_0^t G_{gearbox}\Delta\Omega dt$$

where $\Delta\theta$ is the variable pitch angle variation near a set point, $K_P$ is the first control parameter, $K_I$ is the second control parameter, $\Delta\Omega$ is the wind wheel rotating speed variation, $G_{gearbox}$ is the gearbox transmission ratio, and t is the time variable.

The first calculation unit 22 may further include a fifth acquisition unit 221.

The fifth acquisition unit 221 is configured to acquire a relationship between ∂P/∂θ of a blade of a variable-pitch wind generating set and a variable pitch angle θ by means of blade design, and to perform Taylor expansion on the second relation according to the acquired relationship.

And it is important to note that, the value of ∂P/∂θ in the second control parameter formula is acquired by the fifth acquisition unit 221 in the blade design process.

The second calculation unit 23 is configured to acquire a second-order differential relation of the wind wheel reference rotating speed according to the following formula by means of an aerodynamics torque relation and a control theory on the basis of the above variable pitch angle formula:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} + \left[\frac{1}{\Omega_{ref}}\left(-\frac{\partial P}{\partial \theta}\right)G_{gearbox}K_I\right]\phi = 0$$

where $I_{drivetrain}$ is the moment of inertia in drive train of a wind generating set, P is the absorbed power by a wind wheel, θ is the variable pitch angle, $\ddot{\phi}$ is the wind wheel rotational acceleration, $\dot{\phi}$ is the wind wheel rotating speed variation and $\phi$ is the wind wheel rotating speed.

The fourth acquisition unit 24 is configured to acquire a stable state of the second-order differential relation of a wind wheel rotating speed, and to acquire a first control parameter and a second control parameter in the stable state.

The second acquisition unit 12 is configured to acquire an equivalent differential third control parameter $K_D$ by means of dynamic energy deviation.

Figure 6:
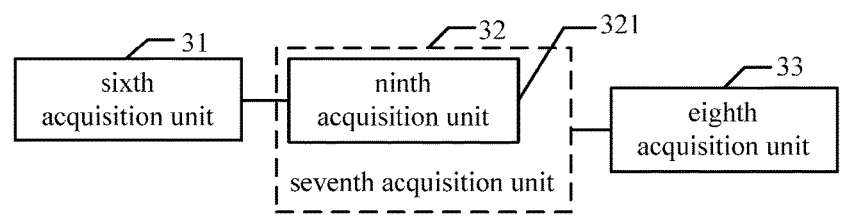
FIG. 6 is a substructure schematic diagram illustrating an apparatus for equivalent differential control of variable pitch according to another embodiment of the present disclosure.

Referring to FIG. 6, a substructure schematic diagram of an apparatus for equivalent differential control of variable pitch according to another embodiment of the present disclosure is illustrated. The second acquisition unit 12 may include a sixth acquisition unit 31, a seventh acquisition unit 32 and an eighth acquisition unit 33.

The sixth acquisition unit 31 is configured to acquire a wind wheel rotating total energy deviation and a static energy deviation by means of an aerodynamics torque relationship.

The seventh acquisition unit 32 is configured to acquire a variable pitch angle of variable pitch absorbed energy by means of the total energy deviation and the static energy deviation.

The seventh acquisition unit 32 may further include a ninth acquisition unit 321.

The ninth acquisition unit 321 is configured to eliminate the static energy deviation, acquire a residual dynamic energy deviation, and acquire the variable pitch angle of variable pitch absorbed energy according to the residual dynamic energy deviation.

The eighth acquisition unit 33 is configured to acquire a third control parameter according to the acquired variable pitch angel.

The controlling unit 13 is configured to control, by a proportion integration differentiation (PID) controller, a wind generating set according to the first control parameter, the second control parameter and the third control parameter by taking a wind wheel measurement rotating speed and a wind wheel reference rotating speed as inputs, so that the wind wheel measurement rotating speed follows the wind wheel reference rotating speed.

Figure 7:
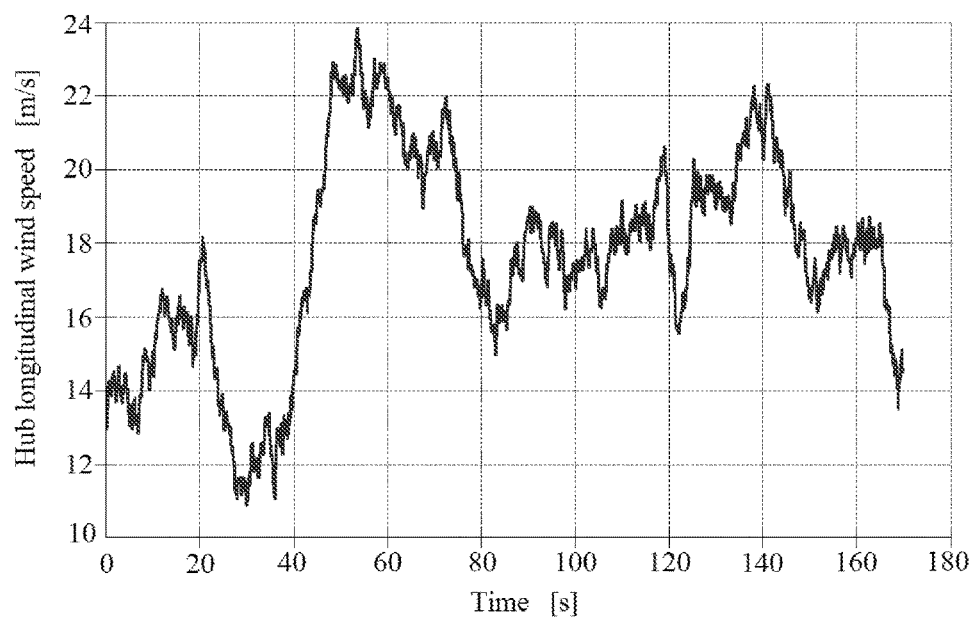
FIG. 7 is a schematic diagram illustrating a kind of wind condition according to an embodiment of the present disclosure.
Figure 8:
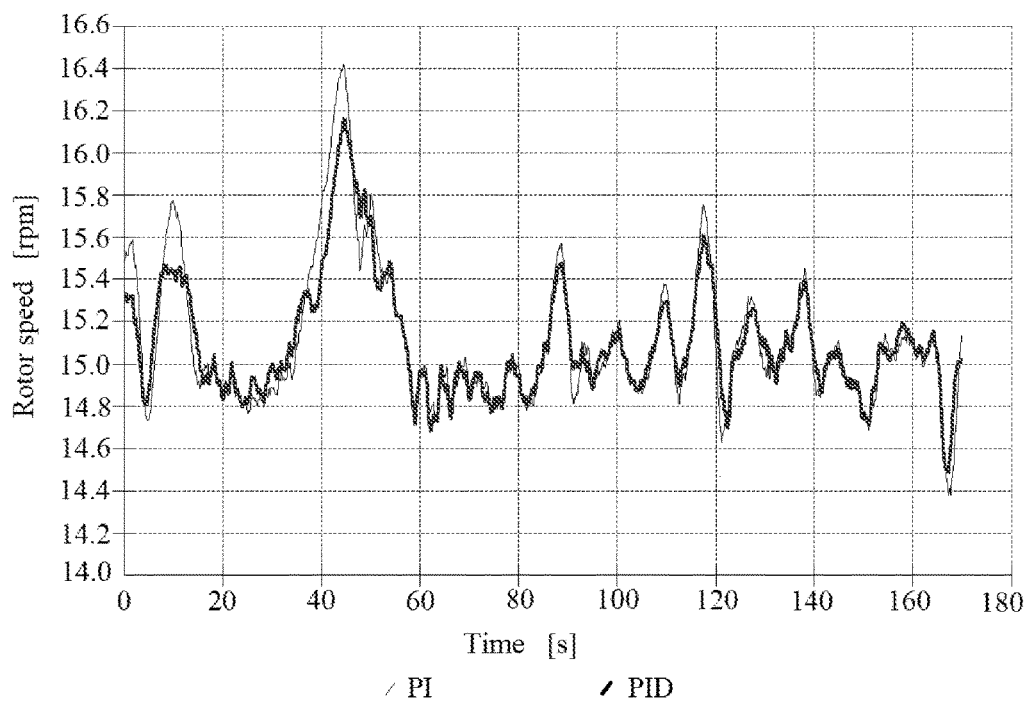
FIG. 8 is a schematic diagram illustrating a comparison of the rotor speed controlled in the method for equivalent differential control of variable pitch and in the traditional control method.
Figure 9:
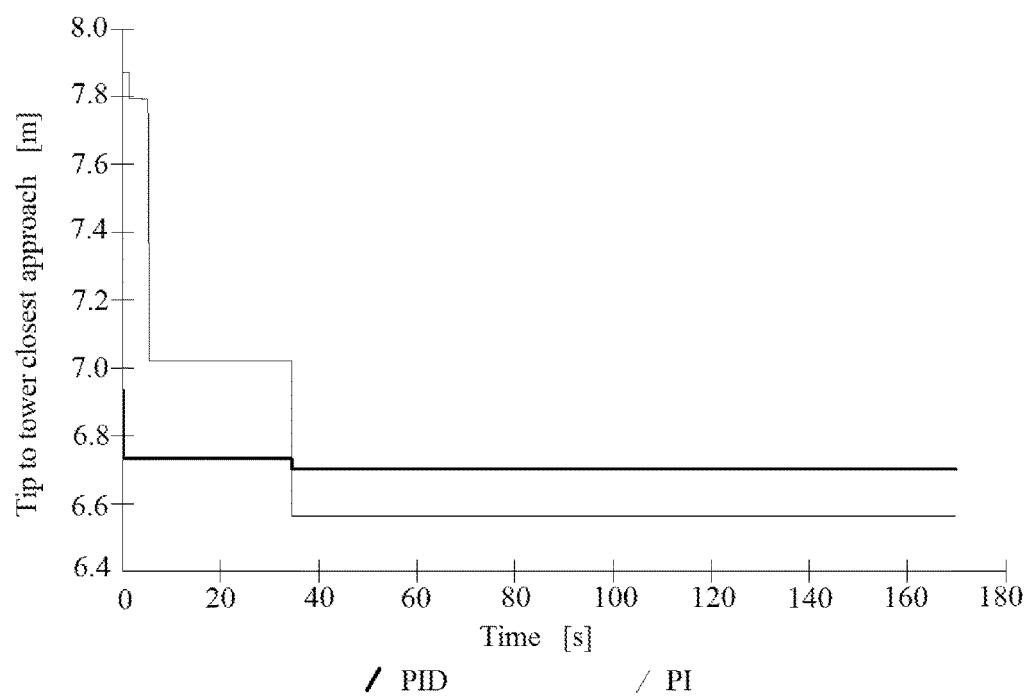
FIG. 9 is a schematic diagram illustrating a comparison of the blade tip gap controlled in the method for equivalent differential control of variable pitch and in the traditional control method.

In an apparatus for equivalent differential control of variable pitch according to an embodiment of the present disclosure, a 2 MW wind generating set under the wind condition shown in FIG. 7 is controlled. FIG. 8 and FIG. 9 illustrate the effect contrast of adopting a traditional control method and adopting the control method according to embodiments of the present disclosure. The dark thick line represents the controlling results by using the control method according to the embodiment of the present disclosure, and the light thin line represents the controlling results acquired by using the traditional PI control method. By comparing the two figures, it is known that, by using the method for equivalent differential control of variable pitch according to the embodiment of the present disclosure, the acquired wind wheel measurement rotating speed fluctuation of a wind generating set is smaller than the wind wheel measurement rotating speed fluctuation acquired by the traditional PI control method, and the blade tip gap is bigger.

With the method for equivalent differential control of variable pitch and apparatus according to the present disclosure, a wind generating set is controlled in a real-time manner by combining first and second control parameters acquired by means of a static energy deviation PI control method and an equivalent differential third control parameter acquired by means of a dynamic energy deviation to serve as parameter values of a PID controller. Compared with the prior art, the method for equivalent differential control of variable pitch provided in the present disclosure may acquire a control parameter with a higher degree of precision in a PID controller, and can improve the dynamic variable pitch action response capability of a large wind generating set under the wind condition of quick change of a wind speed when the wind generating set is controlled by using an equivalent differential parameter acquired by dynamic energy deviation; thus situations such like an over speed of a generating set, an excessive small gap between blade tips, generating an extreme load and the like can be avoided.

Finally, it should also be noted that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A method for differential control of variable pitch, comprising:

acquiring a first control parameter and a second control parameter respectively by means of a static energy deviation PI control method;

acquiring a differential third control parameter using a dynamic energy deviation;

and controlling, by a proportion integration differentiation (PID) controller, a wind turbine generator system according to the first control parameter, the second control parameter and the third control parameter by taking a wind wheel measurement rotating speed and a wind wheel reference rotating speed as inputs, so that the wind wheel measurement rotating speed follows the wind wheel reference rotating speed, wherein the first control parameter is acquired according to a formula:

$$K_P = \frac{2I_{drivetrain}\Omega_{ref}\zeta\omega}{G_{gearbox}\left(-\frac{\partial P}{\partial \theta}\right)}$$

wherein $G_{gearbox}$ is a gearbox transmission ratio, $\Omega_{ref}$ is the wind wheel reference rotating speed, $\omega$ is frequency, $\zeta$ is a damping, $I_{drivetrain}$ is a moment of inertia in a drive train of the wind turbine generator system, P is absorbed power by the wind wheel, and $\theta$ is the variable pitch angle; the second control parameter is acquired according to a formula:

$$K_I = \frac{I_{drivetrain}\Omega_{ref}\omega^2}{G_{gearbox}\left(-\frac{\partial P}{\partial \theta}\right)}$$

wherein $G_{gearbox}$ is the gearbox transmission ratio, $\Omega_{ref}$ is the wind wheel reference rotating speed, ω is frequency, ζ is damping, $I_{drivetrain}$ is the moment of inertia in drive train of the wind turbine generator system, P is the absorbed power by a wind wheel, and θ is the variable pitch angle; and the third control parameter is acquired according to a formula:

$$K_d = \left| \frac{I_{drivetrain}(\Omega - \Omega_{ref})}{G_{gearbox}\left(\frac{\partial P}{\partial \beta}\right)} \right|$$

wherein $G_{gearbox}$ is the gearbox transmission ratio, Ω is the wind wheel measurement rotating speed, $\Omega_{ref}$ is the wind wheel reference rotating speed, ω is the frequency, and ζ is damping.

2. The method according to claim 1, wherein the process of acquiring a first control parameter and a second control parameter respectively comprises:

acquiring a first relation among a wind wheel pneumatic torque, mechanical power and a wind wheel reference rotating speed and a second relation among the wind wheel pneumatic torque, a variable pitch angle, the mechanical power and the wind wheel reference rotating speed respectively within a variable pitch range; performing Taylor expansion on the first relation and the second relation respectively, and acquiring the variable pitch angle according to a formula:

$$\Delta\theta = K_P G_{gearbox} \Delta\Omega + K_I \int_0^t G_{gearbox} \Delta\Omega \, dt$$

wherein Δθ is the variable pitch angle variation near a set point, $K_P$ is the first control parameter, $K_I$ is the second control parameter, ΔΩ is the wind wheel rotating speed variation, $G_{gearbox}$ is the gearbox transmission ratio, and t is a time variable;

acquiring a second-order differential relation of the wind wheel reference rotating speed according to a formula as following by means of an aerodynamics torque relation and a control theory on the basis of the variable pitch angle formula:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} + \left[\frac{1}{\Omega_{ref}}\left(-\frac{\partial P}{\partial \theta}\right)G_{gearbox}K_I\right]\phi = 0$$

wherein $I_{drivetrain}$ is the moment of inertia in drive train of the wind generating system, P is the absorbed power by a wind wheel, θ is the variable pitch angle, $\ddot{\phi}$ is the wind wheel rotational acceleration, $\dot{\phi}$ is the wind wheel rotating speed variation and φ is the wind wheel rotating speed;

and acquiring a stable state of the second-order differential relation of the wind wheel reference rotating speed, and acquiring the first control parameter and the second control parameter in the stable state.

3. The method according to claim 2, wherein the process of performing Taylor expansion on the second relation comprises: acquiring a relationship between ∂P/∂θ of a blade of a variable-pitch wind generating system and the variable pitch angle θ by means of blade design, and performing Taylor expansion on the second relation according to the acquired relationship.

4. The method according to claim 1, wherein the process of acquiring a third control parameter comprises:

acquiring a wind wheel rotating total energy deviation and a static energy deviation by means of an aerodynamics torque relationship;

acquiring a variable pitch angle of variable pitch absorbed energy according to the total energy deviation and the static energy deviation; and acquiring the third control parameter according to the acquired variable pitch angle.

5. The method according to claim 4, wherein the process of acquiring the variable pitch angle of variable pitch absorbed energy according to the total energy deviation and the static energy deviation comprises: eliminating the static energy deviation, acquiring a residual dynamic energy deviation, and acquiring the variable pitch angle of variable pitch absorbed energy according to a residual dynamic energy deviation.

6. An apparatus for differential control of variable pitch, comprising:

a first acquisition unit configured to acquire a first control parameter and a second control parameter respectively by means of a static energy deviation PI control method;

a second acquisition unit configured to acquire a differential third control parameter using a dynamic energy deviation;

and a controlling unit configured to control, by a proportion integration differentiation (PID) controller, a wind turbine generator system according to the first control parameter, the second control parameter and the third control parameter by taking a wind wheel measurement rotating speed and a wind wheel reference rotating speed as inputs, so that the wind wheel measurement rotating speed follows the wind wheel reference rotating speed, wherein the first control parameter is acquired according to a formula:

$$K_P = \frac{2 I_{drivetrain} \Omega_{ref} \zeta \omega}{G_{gearbox}\left(-\frac{\partial P}{\partial \theta}\right)}$$

wherein $G_{gearbox}$ is a gearbox transmission ratio, $\Omega_{ref}$ is the wind wheel reference rotating speed, ω is frequency, ζ is a damping, $I_{drivetrain}$ is a moment of inertia in a drive train of the wind turbine generator system, P is absorbed power by the wind wheel, and θ is the variable pitch angle; the second control parameter is acquired according to a formula:

$$K_I = \frac{I_{drivetrain} \Omega_{ref} \omega^2}{G_{gearbox}\left(-\frac{\partial P}{\partial \theta}\right)}$$

wherein $G_{gearbox}$ is the gearbox transmission ratio, $\Omega_{ref}$ is the wind wheel reference rotating speed, ω is frequency, ζ is damping, $I_{drivetrain}$ is the moment of inertia in drive train of the wind turbine generator system, P is the absorbed power by a wind wheel, and θ is the variable pitch angle; and the third control parameter is acquired according to a formula:

$$K_d = \left| \frac{I_{drivetrain}(\Omega - \Omega_{ref})}{G_{gearbox}\left(\frac{\partial p}{\partial \beta}\right)} \right|$$

wherein $G_{gearbox}$ is the gearbox transmission ratio, $\Omega$ is the wind wheel measurement rotating speed, $\Omega_{ref}$ is the wind wheel reference rotating speed, $\omega$ is the frequency, and $\zeta$ is damping.

7. The apparatus according to claim 6, wherein the first acquisition unit comprises:
a third acquisition unit configured to acquire a first relation among a wind wheel pneumatic torque, mechanical power and a wind wheel reference rotating speed and a second relation among the wind wheel pneumatic torque, a variable pitch angle, the mechanical power and the wind wheel reference rotating speed respectively within a variable pitch range; performing Taylor expansion on the first relation and the second relation respectively, and acquiring the variable pitch angle according to a formula:

$$\Delta\theta = K_P G_{gearbox}\Delta\Omega + K_I \int_0^t G_{gearbox}\Delta\Omega dt$$

wherein $\Delta\theta$ is the variable pitch angle variation near a set point, $K_P$ is the first control parameter, $K_I$ is the second control parameter, $\Delta\Omega$ is the wind wheel rotating speed variation, $G_{gearbox}$ is the gearbox transmission ratio, and t is a time variable;
acquiring a second-order differential relation of the wind wheel reference rotating speed according to a formula as following by means of an aerodynamics torque relation and a control theory on the basis of the variable pitch angle formula:

$$I_{drivetrain}\ddot{\phi} + \left[\frac{1}{\Omega_{ref}}\left(-\frac{\partial P}{\partial \theta}\right)G_{gearbox}K_P - \frac{P_0}{\Omega_{ref}^2}\right]\dot{\phi} +$$

$$\left[\frac{1}{\Omega_{ref}}\left(-\frac{\partial P}{\partial \theta}\right)G_{gearbox}K_I\right]\phi = 0;$$

wherein $I_{drivetrain}$ is the moment of inertia in drive train of the wind generating system, P is the absorbed power by a wind wheel, $\theta$ is the variable pitch angle, $\ddot{\phi}$ is the wind wheel rotational acceleration, $\dot{\phi}$ is the wind wheel rotating speed variation and $\phi$ is the wind wheel rotating speed;
and acquiring a stable state of the second-order differential relation of the wind wheel reference rotating speed, and acquiring the first control parameter and the second control parameter in the stable state.

8. The apparatus according to claim 7, wherein the first calculation unit comprises:
a fifth acquisition unit configured to acquire a relationship between $\partial P/\partial\theta$ of a blade of a variable-pitch wind generating system and the variable pitch angle $\theta$ by means of blade design, and performing Taylor expansion on the second relation according to the acquired relationship.

9. The apparatus according to claim 6, wherein the second acquisition unit comprises:
a sixth acquisition unit configured to acquire a wind wheel rotating total energy deviation and a static energy deviation by means of an aerodynamics torque relationship;
a seventh acquisition unit configured to acquire a variable pitch angle of variable pitch absorbed energy according to the total energy deviation and the static energy deviation; and
an eighth acquisition unit configured to acquire the third control parameter according to the acquired variable pitch angle.

10. The apparatus according to claim 9, wherein the seventh acquisition unit comprises: a ninth acquisition unit configured to eliminate the static energy deviation, acquiring a residual dynamic energy deviation, and acquiring the variable pitch angle of variable pitch absorbed energy according to a residual dynamic energy deviation.

* * * * *